United States Patent

Öhlschläger et al.

Patent Number: 5,888,709
Date of Patent: Mar. 30, 1999

[54] PHOTOGRAPHIC RECORDING MATERIAL

[75] Inventors: Hans Öhlschläger; Wolfgang Schmidt, both of Bergisch Gladbach; Dieter Rockser, Leichlingen; Gustav Tappe, Leverkusen, all of Germany

[73] Assignee: Agfa-Gevaert AG, Germany

[21] Appl. No.: 703,200

[22] Filed: Aug. 26, 1996

[30] Foreign Application Priority Data

Aug. 30, 1995 [DE] Germany ............ 195 31 894.3

[51] Int. Cl.⁶ .................................................. G03C 1/83
[52] U.S. Cl. ........................................ 430/522; 430/595
[58] Field of Search .................... 430/522, 594, 430/595

[56] References Cited

U.S. PATENT DOCUMENTS

| | | | |
|---|---|---|---|
| 4,877,721 | 10/1989 | Diehl et al. | 430/522 |
| 5,314,796 | 5/1994 | Mulai et al. | 430/522 |

FOREIGN PATENT DOCUMENTS

A-246 553   11/1987   European Pat. Off. .

*Primary Examiner*—Richard L. Schilling
*Attorney, Agent, or Firm*—Connolly & Hutz

[57] ABSTRACT

Oxonol dyes of the formula I

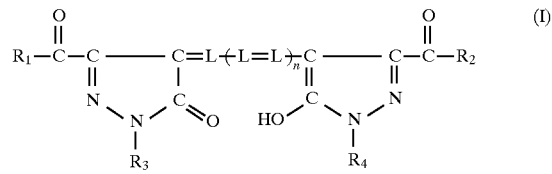

in which $R_1$, $R_2$ mean an optionally substituted furyl or thienyl group, $R_3$, $R_4$ mean an aryl group substituted with at least two sulpho groups, L means CH or $CR_5$, $R_5$ means $C_1$–$C_4$ alkyl and n means 0, 1 or 2, give rise in a photographic material to an improvement in sharpness.

8 Claims, No Drawings

PHOTOGRAPHIC RECORDING MATERIAL

This invention relates to a photographic recording material with novel oxonol dyes.

It is known to add dyes to the layers of a photographic recording material in order to absorb unwanted radiation. If these dyes are added directly to a photosensitive layer, they are described as sharpness dyes because they absorb radiation scattered between the emulsion layers and so improve sharpness. Such dyes may simultaneously be used to control sensitivity because they absorb a proportion of the incident light.

Selection of the dyes is dependent upon many factors. A usable dye must fulfil various requirements:

1. The dye must absorb light of the desired spectral range to the greatest possible extent. It is also necessary, especially in colour material, for the dye to absorb as little as possible in adjacent spectral ranges.
2. The dye should be as water-soluble as possible, so that it may readily be introduced into the material.
3. Once the material is processed, the dye must not leave behind any coloration, nor must it discolour the processing baths, for example the developer, or contaminate them by sludge formation.
4. The dye must be photographically inert. Self-evidently, the dye must not cause fogging or influence the sensitometry of the material. In particular, it must neither desensitise the emulsion itself nor bring about desensitisation by displacing sensitisers.

It is primarily dyes of the oxonol series which are of interest as sharpness dyes, wherein oxonol dyes of the pyrazolone series are in particular used.

Suitable oxonol dyes are known, for example, from U.S. Pat. No. 2,036,546, GB-A-1 177 429, DE-A-2 259 746, DE-A-2 713 261, U.S. Pat. No. 3,984,246, U.S. Pat. No. 3,989,528, EP-A286 331, EP-A-362 734 and EP-A-388 908.

If the correct substituents are selected, known oxonol dyes can fulfil many requirements. There are, however, problems associated with using known oxonol dyes in photographic recording materials with an elevated silver chloride content, as these materials are sensitised at long wavelengths in such a manner that it is not longer possible to adapt the absorption properties of the sharpness dyes to the sensitisation curve. In order to achieve the desired improvements in sharpness with existing oxonol dyes, large quantities of dye must consequently be used, so causing considerable loading of the layers.

A further improvement has been achieved with the oxonol dyes having 3-acylpyrazolone rings from EP-A-246 553. However, these dyes colour the emulsion layers, particularly if they have a 3-benzoylpyrazolone ring, and are thus unusable.

The object of the invention was thus to provide novel sharpness dyes having a wide area of applicability, but which do not exhibit hitherto known side effects.

It has now been found that this object may be achieved with the oxonol dyes of the formula I stated below.

The present invention accordingly provides a photographic recording material with a support and at least one photosensitive silver halide emulsion layer, characterised in that the material contains at least one compound of the formula I

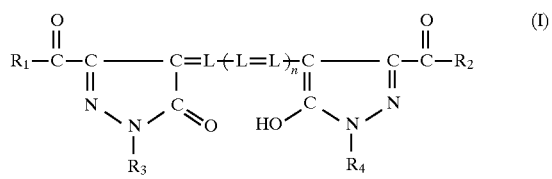

in which $R_1$, $R_2$ mean an optionally substituted furyl or thienyl group, $R_3$, $R_4$ mean an aryl group substituted with at least two sulpho groups, L means CH or $CR_5$, $R_5$ means $C_1$–$C_4$ alkyl and n means 0, 1 or 2.

The invention furthermore relates to the oxonol dyes of the formula I.

If $R_1$ or $R_2$ is a substituted furyl or thienyl group, this group is preferably substituted by one or more substituents selected from the series $C_1$–$C_4$ alkyl, —$NO_2$ and —Cl.

Examples of particularly suitable residues $R_1$ and $R_2$ in the formula I are:

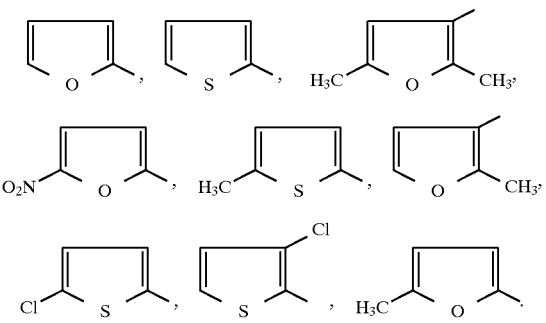

The aryl group substituted with at least sulpho groups may bear further substituents. These may, for example, be $C_1$–$C_4$ alkyl, —OH or —Cl.

Examples of particularly suitable residues $R_3$ and $R_4$ in the formula I are:

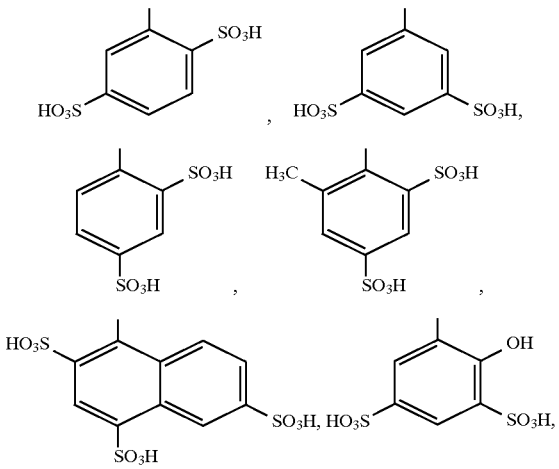

-continued

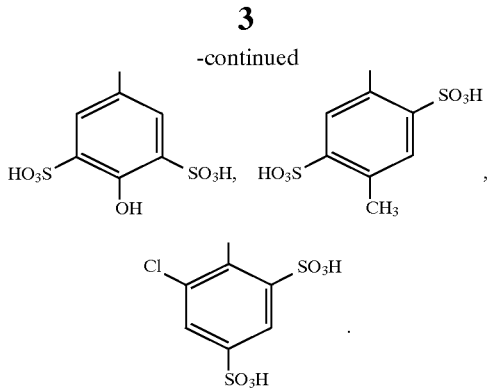

In a preferred embodiment of the invention, each of the pairs of residues $R_1$ and $R_2$, and $R_3$ and $R_4$ has the same meaning and the oxonol dyes according to the invention are of the formula II

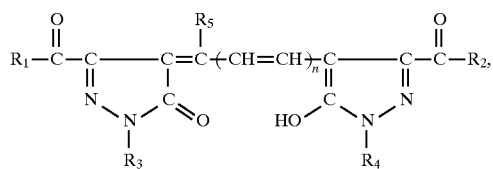

in which $R_1=R_2$ means an optionally substituted furyl or thienyl group, $R_3=R_4$ means an aryl group substituted with at least two sulpho groups, $R_5$ means $C_1$–$C_4$ alkyl and n means 0, 1 or 2.

Examples of compounds according to the invention of the formula II are stated below:

| No. | $R_1/R_2$ | $R_3/R_4$ | $R_5$ | n |
|---|---|---|---|---|
| F-1 | 2-furyl | 2,5-disulphophenyl | H | 2 |
| F-2 | 2-thienyl | 2,5-disulphophenyl | H | 2 |
| F-3 | 2-thienyl | 2,5-disulphophenyl | H | 1 |
| F-4 | 2-furyl | 2,5-disulphophenyl | H | 1 |
| F-5 | 2-furyl | 2,5-disulphophenyl | H | 0 |
| F-6 | 2-furyl | 2,4-disulphophenyl | H | 2 |
| F-7 | 2-thienyl | 2,4-disulphophenyl | H | 2 |
| F-8 | 5-nitro-2-furyl | 3,5-disulphophenyl | H | 2 |
| F-9 | 5-methyl-2-thienyl | 3,5-disulphophenyl | H | 2 |
| F-10 | 2-furyl | 2,4,6-trisulphonaphthyl | H | 2 |
| F-11 | 5-chloro-2-thienyl | 2,5-disulphophenyl | H | 2 |
| F-12 | 2-furyl | 5-methyl-2,4-disul-phophenyl | H | 1 |
| F-13 | 2-furyl | 4-methyl-2,5-disul-phophenyl | H | 2 |
| F-14 | 3-chloro-2-thienyl | 2,5-disulphophenyl | H | 2 |
| F-15 | 2-furyl | 2,5-disulphophenyl | $CH_3$ | 1 |

In another preferred embodiment of the invention, the photographic recording material is a colour photographic paper with silver chloride-bromide emulsions containing above 95 mol. % of AgCl.

The oxonol dyes of the formulae I and II are conventionally used in the photographic material in a quantity of 1 to 100 mg/m². A quantity of 5 to 20 mg/m² is particularly preferred.

The dyes according to the invention may readily be produced by fusing 3-furoyl- or 3-thenoylpyrazolones with appropriate linking members. The production of some dyes is described below by way of example. The starting materials are commercially available.

Production of dye no. 1
1st stage 1-(2',5'-disulphophenyl)-3-furoyl-5-pyrazolone disodium salt 27.5 g of 2,5-aminobenzenedisulphonic acid monosodium salt are suspended in 100 ml of water and neutralised with concentrated sodium hydroxide solution. 6.9 g of sodium nitrite are added and the solution cooled. 33 ml of concentrated hydrochloric acid and 100 ml of water are added dropwise at 0°–5° C. and the solution is stirred for a further 1.5 hours at this temperature. The resultant diazonium salt solution is then transferred at 5°–10° C. into a mixture of 25 g of 3-acetyl-3-furoylpropionic acid ethyl ester in 100 ml of water and 28 g of sodium hydrogen carbonate. The mixture is then stirred for 3 hours at room temperature, adjusted to pH 11 with concentrated sodium hydroxide solution and stirred for a further 30 minutes. The pH is adjusted to 6 with concentrated hydrochloric acid and the mixture is evaporated to dryness under a vacuum. The residue is decocted with 600 ml of methanol, salts are filtered out and the methanol solution is evaporated to 100 ml and vacuum filtered. 41.2 g of pyrazolone, yield 90 mol. %, are obtained. The pyrazolone still contains 5 wt. % of common salt, but may be used for dye production without further purification.

2nd stage bis-(3-furoyl- 1-(2',5'-disulphophenyl)-5-pyrazolone) pentamethine-oxonol tetrasodium salt 17.7 g of the pyrazolone produced in stage 1 are mixed with 4.97 g of glutaconic dialdehyde-dianilide hydrochloride in 30 ml of water, 5 ml of glacial acetic acid and 75 ml of pyridine and stirred for 4 hours at room temperature with 10 ml of triethylamine. The dye is precipitated by the addition of 110 ml of 20 wt. % methanolic sodium iodide solution and suction filtered. Purification is by recrystallisation from 40 ml of water and 110 ml of 20 wt. % methanolic sodium iodide solution. Yield 15.8 g=88 mol. %. Absorption maximum in water: 651 nm, $E_{max}$ 127000.

Production of dye no. 2
1st stage 3-thenoyl-1-(2',5'-disulphophenyl)-5-pyrazolone disodium salt In a similar manner to stage 1 for dye no. 1, yield: 83 mol. %.

2nd stage bis-(3-thenoyl-1-(2',5'-disulphenyl)-5-pyrazolone)pentamethineoxonol tetrasodium salt 13.74 g of 3-thenoyl-1-(2',5'-disulphenyl)-5-pyrazolone disodium salt are fused in a similar manner to stage 2 for dye no. 1 with 3.97 g of glutaconic dialdehyde-dianilide hydrochloride. Yield 11 g=78 mol. %. Absorption maximum in water: 652 nm, $E_{max}$ 119000.

Production of dye no. 4

10.6g of 3-furoyl-1-(2',5'-disulphenyl)-5-pyrazolone disodium salt, stage 1 of dye no. 1, are dissolved in 15 ml of water, 37.5 ml of pyridine and 2.5 ml of glacial acetic acid and stirred for 4 hours at room temperature with 2.9 g of anilinoacroleinanil hydrochloride and 7.5 ml of triethylamine. The dye is precipitated with 60 ml of 20 wt. % methanolic sodium iodide solution, suction filtered and purified by recrystallisation from water/methanolic sodium iodide solution. 7.7 g=74 mol. % of bis-(3-furoyl-1-(2',5'-disulphenyl)-5-pyrazolone)-trimethineoxonol tetrasodium salt are obtained. Absorption maximum in water: 558 nm, $E_{max}$ 70500.

As may be seen, the pyrazolones and oxonol dyes according to the invention may be produced with substantially better yields than the corresponding acetyl derivatives from EP-A-246 553. The yield of the 3-acetylpyrazolone derivative is stated therein to be 21 mol. % and that of the pentamethineoxonol produced therefrom to be 14 mol. %.

The photographic recording material may be a black-&-white or preferably colour photographic material.

Examples of colour photographic materials are colour negative films, colour reversal films, colour positive films, colour photographic paper, colour reversal photographic paper, colour sensitive materials for the dye diffusion transfer process or the silver dye bleaching process.

Photographic materials consist of a support onto which at least one photosensitive silver halide emulsion layer is applied. Suitable supports are in particular thin films and sheets. A review of support materials and of the auxiliary layers applied to the front and reverse thereof is given in *Research Disclosure* 37254, part 1 (1995), page 285.

Colour photographic materials conventionally contain at least one red-sensitive, one green-sensitive and one blue-sensitive silver halide emulsion layer optionally together with interlayers and protective layers.

Depending upon the nature of the photographic material, these layers may be differently arranged. This is described for the most important products:

Colour photographic films such as colour negative films and colour reversal films have on the support, in the stated sequence, 2 or 3 red-sensitive, cyan-coupling silver halide emulsion layers, 2 or 3 green-sensitive, magenta-coupling silver halide emulsion layers and 2 or 3 blue-sensitive yellow-coupling silver halide emulsion layers. The layers of identical spectral sensitivity differ with regard to their photographic sensitivity, wherein the lower sensitivity partial layers are generally arranged closer to the support than the higher sensitivity partial layers.

A yellow filter layer is conventionally arranged between the green-sensitive and blue-sensitive layers, which filter layer prevents blue light from penetrating the underlying layers.

Colour photographic paper, which is generally substantially less photosensitive than a colour photographic film, conventionally has on the support, in the stated sequence, one blue-sensitive, yellow-coupling silver halide emulsion layer, one green-sensitive, magenta-coupling silver halide emulsion layer and one red-sensitive, cyan-coupling silver halide emulsion layer; the yellow filter layer may be omitted.

The number and arrangement of the photosensitive layers may be varied in order to achieve specific results. For example, all high sensitivity layers may be grouped together in one package of layers and all low sensitivity layers may be grouped together in another package of layers in order to increase sensitivity (DE-A-25 30 645).

Possible options for different layer arrangements and the effects thereof on photographic properties are described in *J. Inf. Rec. Mats.*, 1994, volume 22, pages 183–193.

The substantial constituents of the photographic emulsion layers are binder, silver halide grains and colour couplers.

Details of suitable binders may be found in *Research Disclosure* 37254, part 2 (1995), page 286.

Details of suitable silver halide emulsions, the production, ripening, stabilisation and spectral sensitisation thereof, including suitable spectral sensitisers, may be found in *Research Disclosure* 37254, part 3 (1995), page 286 and in *Research Disclosure* 37038, part XV (1995), page 89.

Photographic materials with camera sensitivity conventionally contain silver bromide-iodide emulsions, which may optionally also contain small proportions of silver chloride. Photographic print materials contain either silver chloride-bromide emulsion with up to 80 mol. % of AgBr or silver chloride-bromide emulsions with above 95 mol. % of AgCl.

Details relating to colour couplers may be found in *Research Disclosure* 37254, part 4 (1995), page 288 and in *Research Disclosure* 37038, part II (1995), page 80. The maximum absorption of the dyes formed from the couplers and the developer oxidation product is preferably within the following ranges: yellow coupler 430 to 460 nm, magenta coupler 540 to 560 nm, cyan coupler 630 to 700 nm.

In order to improve sensitivity, grain, sharpness and colour separation in colour photographic films, compounds are frequently used which, on reaction with the developer oxidation product, release photographically active compounds, for example DIR couplers which eliminate a development inhibitor.

Details relating to such compounds, in particular couplers, may be found in *Research Disclosure* 37254, part 5 (1995), page 290 and in *Research Disclosure* 37038, part XIV (1995), page 86.

Colour couplers, which are usually hydrophobic, as well as other hydrophobic constituents of the layers, are conventionally dissolved or dispersed in high-boiling organic solvents. These solutions or dispersions are then emulsified into an aqueous binder solution (conventionally a gelatine solution) and, once the layers have dried, are present as fine droplets (0.05 to 0.8 μm in diameter) in the layers.

Suitable high-boiling organic solvents, methods for the introduction thereof into the layers of a photographic material and further methods for introducing chemical compounds into photographic layers may be found in *Research Disclosure* 37254, part 6 (1995), page 292.

The non-photosensitive interlayers generally located between layers of different spectral sensitivity may contain agents which prevent an undesirable diffusion of developer oxidation products from one photosensitive layer into another photosensitive layer with a different spectral sensitisation.

Suitable compounds (white couplers, scavengers or DOP scavengers) may be found in *Research Disclosure* 37254, part 7 (1995), page 292 and in *Research Disclosure* 37038, part III (1995), page 84.

The photographic material may also contain UV light absorbing compounds, optical whiteners, spacers, filter dyes, formalin scavengers, light stabilisers, anti-oxidants, $D_{min}$ dyes, additives to improve stabilisation of dyes, couplers and whites and to reduce colour fogging, plasticisers (latices), biocides and others.

Suitable compounds may be found in *Research Disclosure* 37254, part 8 (1995), page 292 and in *Research Disclosure* 37038, parts IV, V, VI, VII, X, XI and XIII (1995), pages 84 et seq..

The layers of colour photographic materials are conventionally hardened, i.e. the binder used, preferably gelatine, is crosslinked by appropriate chemical methods.

Suitable hardener substances may be found in *Research Disclosure* 37254, part 9 (1995), page 294 and in *Research Disclosure* 37038, part XII (1995), page 86.

Once exposed with an image, colour photographic materials are processed using different processes depending upon their nature. Details relating to processing methods and the necessary chemicals are disclosed in *Research Disclosure* 37254, part 10 (1995), page 294 and in *Research Disclosure*

37038, parts XVI to XXIII (1995), pages 95 et seq. together with example materials.

EXAMPLE

A multilayer colour photographic recording material was produced by applying the following layers in the stated sequence onto a film support of paper coated on both sides with polyethylene. All stated quantities relate to 1 m², the quantity of silver is stated as $AgNO_3$.

Sample 1.1

1st layer (substrate layer)
 0.10 g of gelatine
2nd layer (blue-sensitive layer)
 Blue-sensitive silver halide emulsion (99.5 mol. % chloride and 0.5 mol. % bromide, average grain diameter 0.9 μm) prepared from 0.50 g of $AgNO_3$ and
 1.25 g of gelatine
 0.60 g of yellow coupler Y-1
 0.12 g of image stabiliser BS-1
 0.50 g of tricresyl phosphate (TCP)
 0.10 g of stabiliser ST-1
 0.70 mg of blue sensitiser S-1
 0.30 mg of stabiliser ST-2
3rd layer (interlayer)
 1.10 g of gelatine
 0.06 g of oxform scavenger O-1
 0.06 g of oxform scavenger O-2
 0.12 g of TCP
4th layer (green-sensitive layer)
 Green-sensitised silver halide emulsion (99.5 mol. % chloride, 0.5 mol. % bromide, average grain diameter 0.47 μm) prepared from 0.30 g of $AgNO_3$ and
 1.00 g of gelatine
 0.30 g of magenta coupler M-1
 0.25 g of image stabiliser BS-2
 0.15 g of image stabiliser BS-3
 0.70 mg of green sensitiser S-2
 0.50 mg of stabiliser ST-3
5th layer (UV protective layer)
 1.15 g of gelatine
 0.50 g of UV absorber UV-1
 0.10 g of UV absorber UV-2
 0.03 g of oxform scavenger O-1
 0.03 g of oxform scavenger O-2
 0.35 g of TCP
6th layer (red-sensitive layer)
 Red-sensitised silver halide emulsion (99.5 mol. % chloride, 0.5 mol. % bromide, average grain diameter 0.5 μm) prepared from 0.30 g of $AgNO_3$ and
 1.00 g of gelatine
 0.46 g of cyan coupler C-1
 0.46 g of TCP
 0.03 mg of red sensitiser S-3
 20.60 mg of stabiliser ST-4
7th layer (UV protective layer)
 0.35 g of gelatine
 0.15 g of UV absorber UV-1
 0.03 g of UV absorber UV-2
 0.09 g of TCP
8th layer (protective layer)
 0.90 g of gelatine
 0.05 g of optical whitener
 0.07 g of polyvinyl pyrrolidone
 1.20 g of silicone oil
 2.50 mg of polymethyl methacrylate (spacer)
 0.30 g of hardener H-1
 16 mg of dye FA-1
 6 mg of dye FA-2
 6 mg of tartrazine

Sample 1.2

The layer structure was produced as in sample 1.1, with the difference that in the 8th layer comparison dye FA-1 was used in a quantity of 27 mg/M².

Sample 1.3

The layer structure was produced as in sample 1.1, with the difference that in the 8th layer comparison dye FA-1 was replaced with a quantity of 16 mg/m² of dye F-1 according to the invention.

Sample 1.4

The layer structure was produced as in sample 1.1, with the difference that in the 8th layer a quantity of 9.6 mg/m² of dye F-1 according to the invention was used instead of comparison dye FA-1.

The samples were exposed through a graduated step wedge and processed in the following manner in the processing baths listed below:

| a) Colour developer (45 s/35° C.) | |
|---|---|
| Triethanolamine | 9.0 g |
| N,N-diethylhydroxylamine | 4.0 g |
| Diethylene glycol | 0.05 g |
| 3-methyl-4-amino-N-ethyl-N-methanesulphonamino-ethylaniline sulphate | 5.0 g |
| Potassium sulphite | 0.2 g |
| Triethylene glycol | 0.05 g |
| Potassium carbonate | 22 g |
| Potassium hydroxide | 0.4 g |
| Ethylenediaminetetraacetic acid, disodium salt | 2.2 g |
| Potassium chloride | 2.5 g |
| 1,2-dihydroxybenzene-3,4,6-trisulphonic acid, trisodium salt | 0.3 g |
| make up to 1000 ml with water; pH 10.0 | |
| b) Bleach/fixing bath (45 s/35° C.) | |
| Ammonium thiosulphate | 75 g/l |
| Sodium hydrogen sulphite | 13.5 g/l |
| Ethylenediaminetetraacetic acid (iron/ammonium salt) | 57 g/l |
| Ammonia, 25 wt. % | 9.5 g/l |
| Acetic acid | 9.0 g/l |
| make up to 1000 ml with water; pH 5.5 | |
| c) Rinsing (2 min/35° C.) | |
| d) Drying | |

The sensitivity and sharpness in the cyan (bg) range of the spectrum was measured on the processed samples. Sensitivity was determined at an optical density of D=0.6 of the red-sensitive silver halide emulsion layer. Sharpness is stated as the optical edge transfer function ETF at 8 lines/mm and an optical density of D=1.0. The test results are shown in the following table.

TABLE

| Sample | Dye | Quantity (mg/m$^2$) | $E_{bg}$ [log I −t] × 100 | Sharpness$_{bg}$ [%] | |
|---|---|---|---|---|---|
| 1.1 | FA-1 | 16 | 100 | 37 | Comparison |
| 1.2 | FA-1 | 27 | 65 | 41 | Comparison |
| 1.3 | F-1 | 16 | 68 | 42 | Invention |
| 1.4 | F-1 | 9.6 | 101 | 39 | Invention |

It is clear that the better light absorption of the dye F-1 according to the invention allows the use of a smaller quantity to achieve an identical improvement in sharpness; when identical quantities are used, sharpness is improved.

FA-1="Dye 1" from EP-A-246 553.

Substances used in the example:

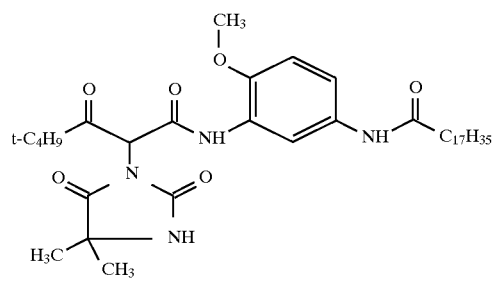

Y-1

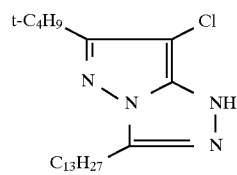

M-1

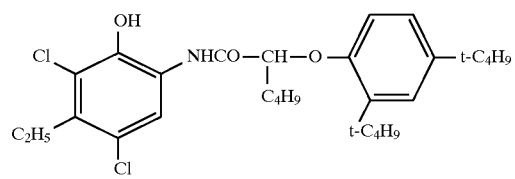

C-1

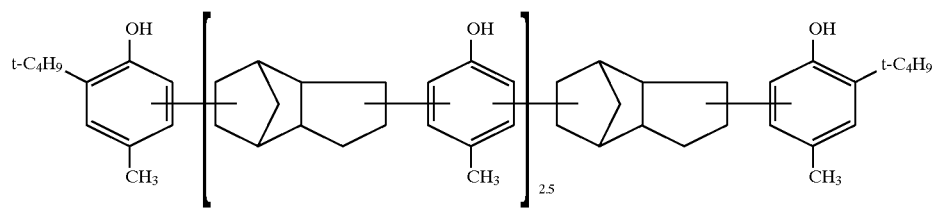

BS-1

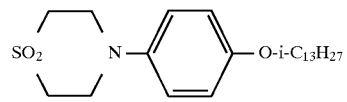

BS-2

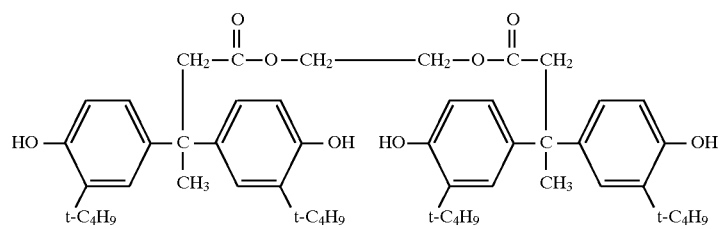

BS-3

-continued
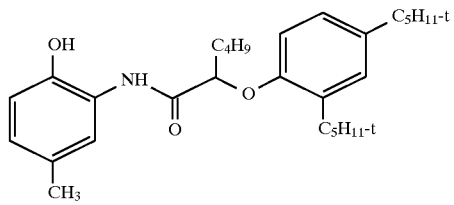
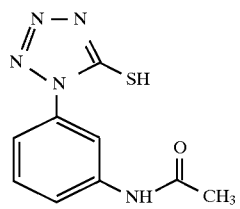 ST-1
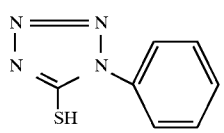 ST-2
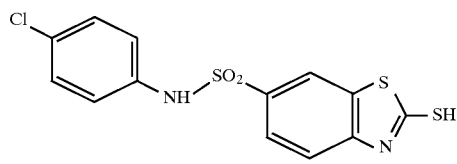 ST-3
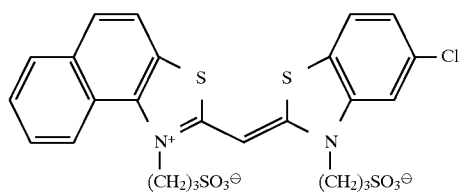 ST-4
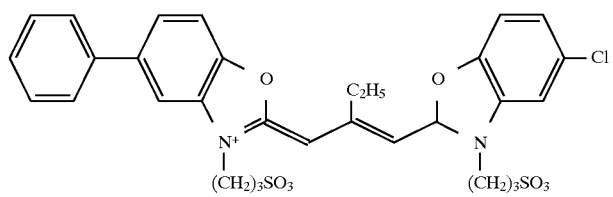 S-1
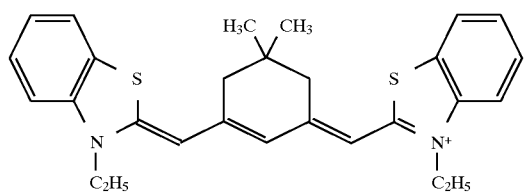 S-2
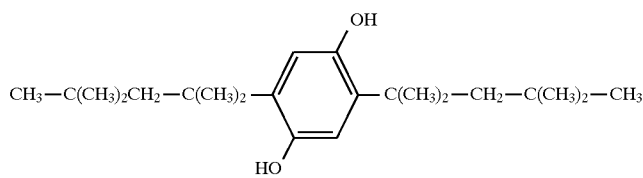 S-3
O-1

-continued
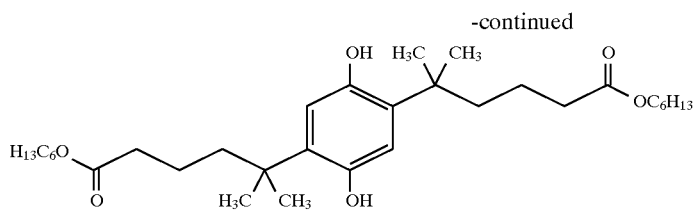
O-2
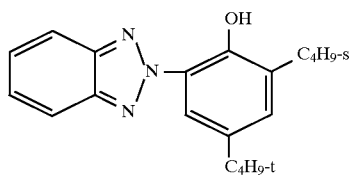
UV-1
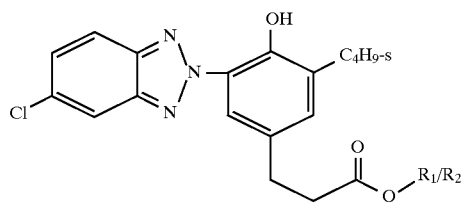
UV-2
$R_1 = n\text{-}C_8H_{17}$
$R_2 = -CH_2-CH(C_2H_5)-C_4H_9$
$R_1/R_2 = 1:1$
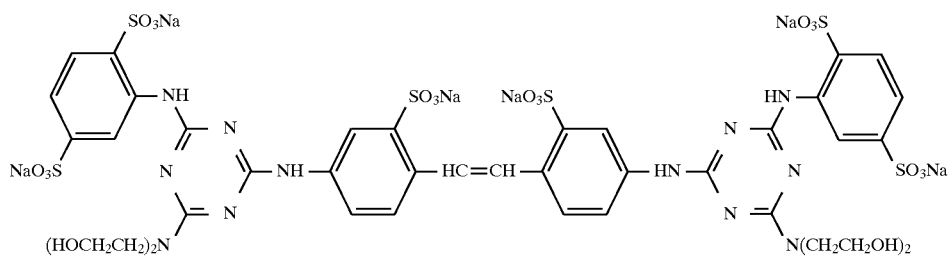
W-1
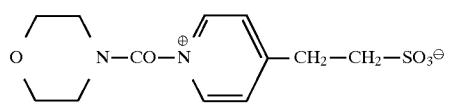
H-1
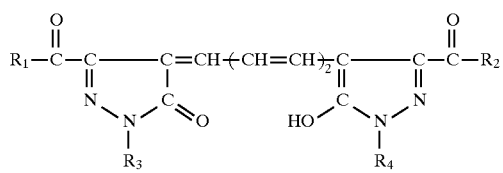
FA-1
$R_1, R_2 =$ methyl
$R_3, R_4 =$ 2,5-disulphophenyl
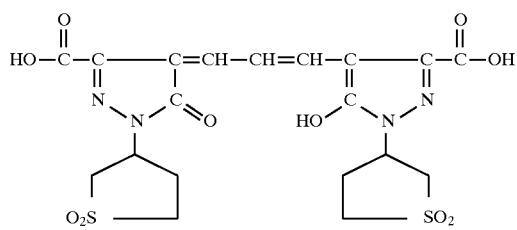
FA-2

We claim:

1. Photographic recording material comprising a support and at least one photosensitive silver halide emulsion layer, wherein the recording material contains at least one compound of the formula I $$R_1-\overset{O}{\underset{\|}{C}}-\overset{}{\underset{\underset{R_3}{\underset{|}{N}}\diagdown N}{\overset{}{C}}}\overset{}{\underset{\diagdown \overset{}{C}=O}{\|}}-C=L(\text{-}L=L\text{-})_nC-\overset{}{\underset{\underset{HO}{\diagup}\overset{}{C}\diagdown N\diagdown N}{\|}}\overset{}{\underset{R_4}{\|}}-\overset{O}{\underset{\|}{C}}-R_2 \quad (I)$$

in which

R₁ and R₂ independently of one another mean an optionally substituted furyl or thienyl group, R₃ and R₄ independently of one another mean an aryl group substituted with at least two sulpho groups, L means CH or CR₅

R₅ means $C_1$–$C_4$ alkyl and n means 0, 1 or 2.

2. Photographic recording material according to claim 1, wherein the compound of the formula I is of the formula II $$R_1-\overset{O}{\underset{\|}{C}}-\overset{}{\underset{\underset{R_3}{\underset{|}{N}}\diagdown N}{\overset{}{C}}}\overset{}{\underset{\diagdown \overset{}{C}=O}{\|}}-C=\overset{R_5}{\underset{|}{C}}(\text{-}CH=CH\text{-})_nC-\overset{}{\underset{\underset{HO}{\diagup}\overset{}{C}\diagdown N\diagdown N}{\|}}\overset{}{\underset{R_4}{\|}}-\overset{O}{\underset{\|}{C}}-R_2 \quad (II)$$

in which

R₁ is identical to R₂

R₃ is identical to R₄

R₅ means $C_1$–$C_4$ and n means 0, 1 or 2.

3. Photographic recording material according to claim 1, wherein at least one of the residues R₁ or R₂ or both residues R₁ and R₂ are

[chemical structures: furyl, thienyl, 2,5-dimethylfuryl, 5-nitrofuryl, 5-methylthienyl, 5-methylfuryl, 5-chlorothienyl, 3-chlorothienyl, or 5-methyl-2-furyl]

4. Photographic recording material according to claim 1, a wherein at least one of the residues R₃ or R₄ or both residues R₃ and R₄ are

[chemical structures: 2-methyl-4-sulfo-benzenesulfonic acid, 5-methyl-1,3-benzenedisulfonic acid, 2,4-dimethyl-1,5-benzenedisulfonic acid, 3,5-dimethyl-1-sulfo..., 4-methyl-3,8-disulfo-naphthalene-1-sulfonic acid, 4-hydroxy-3,5-disulfo..., 3-methyl-4-hydroxy-1,5-benzenedisulfonic acid, 4-methyl-1,2-benzenedisulfonic acid, or 3-chloro-2-methyl-1,5-benzenedisulfonic acid]

5. Photographic recording material according to claim 1, wherein the recording material contains the compound of the formula I or II in a quantity of 5 to 20 mg/m².

6. Photographic recording material according to claim 1, wherein the recording material is a color photographic paper with silver chloride-bromide emulsions containing above 95 mol. % of AgCl.

7. The photographic recording material according to claim 1, wherein R¹ and R² independently of one another are substituted by a substituent selected from the group consisting of $C_1$–$C_4$ alkyl, —NO₂ and —Cl.

8. The photographic recording material as claimed in claim 2, wherein both residues R₁ and R₂ are

[chemical structures: same set of furyl/thienyl groups as in claim 3]

and both residues R₃ and R₄ are

[chemical structures: same sulfonated aryl groups as in claim 4]

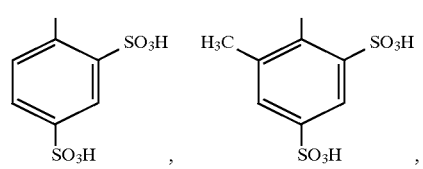 , 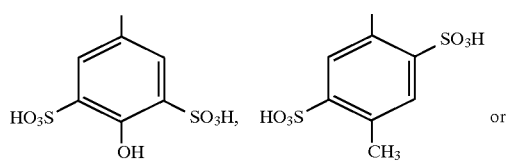
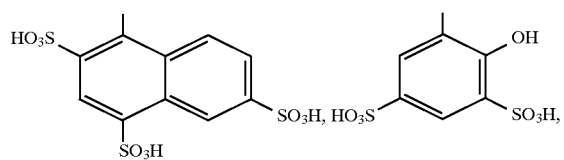 , 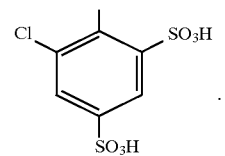 or
* * * * *